Oct. 7, 1952 R. F. STEHLIK 2,613,278

TELEPHONE SYSTEM

Filed April 25, 1947 6 Sheets-Sheet 1

INVENTOR
RUDOLPH FRANK STEHLIK

BY Chas. W. Candy

ATTORNEY.

Oct. 7, 1952 R. F. STEHLIK 2,613,278

TELEPHONE SYSTEM

Filed April 25, 1947 6 Sheets-Sheet 2

INVENTOR
RUDOLPH FRANK STEHLIK

BY Chas. W. Cardy.

ATTORNEY.

Oct. 7, 1952 R. F. STEHLIK 2,613,278

TELEPHONE SYSTEM

Filed April 25, 1947 6 Sheets-Sheet 3

INVENTOR
RUDOLPH FRANK STEHLIK
BY Chas. W. Conly
ATTORNEY.

Oct. 7, 1952 R. F. STEHLIK 2,613,278

TELEPHONE SYSTEM

Filed April 25, 1947 6 Sheets-Sheet 4

INVENTOR
RUDOLPH FRANK STEHLIK

BY Chas. W. Candy
ATTORNEY.

Oct. 7, 1952 R. F. STEHLIK 2,613,278

TELEPHONE SYSTEM

Filed April 25, 1947 6 Sheets-Sheet 5

INVENTOR
RUDOLPH FRANK STEHLIK

BY Chas. W. Candy
ATTORNEY.

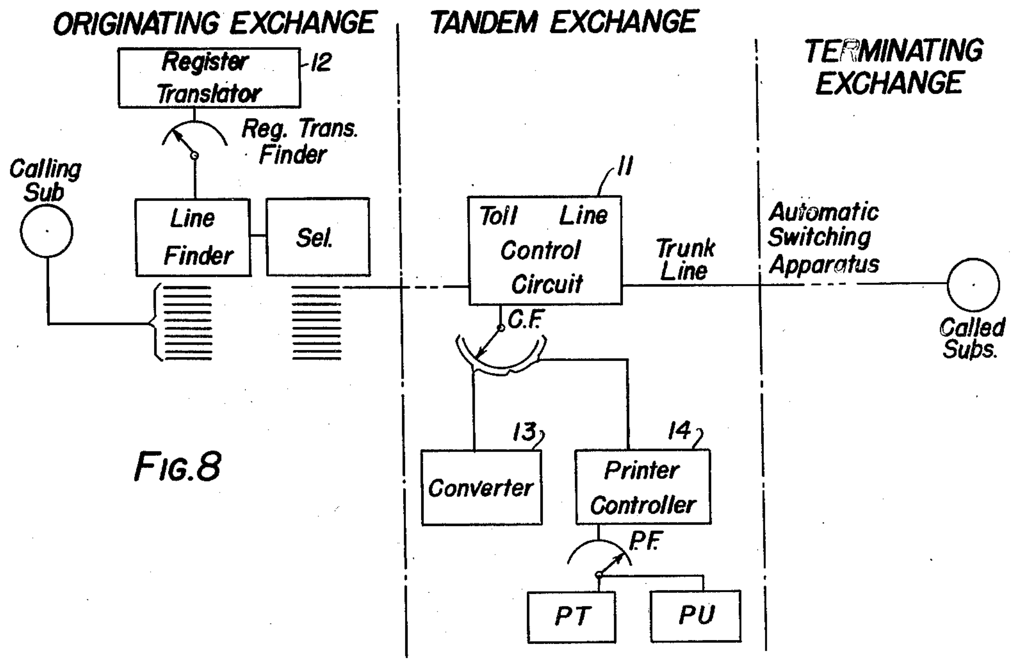
FIG. 8
| | 120 | 130 | 140 | 150 |
|---|---|---|---|---|
| 1 | X | X | | |
| 2 | X | | X | |
| 3 | X | | | X |
| 4 | | X | X | |
| 5 | | X | | X |
| 6 | | | X | X |
| 7 | X | | | |
| 8 | | X | | |
| 9 | | | X | |
| 0 | | | | X |
FIG. 7
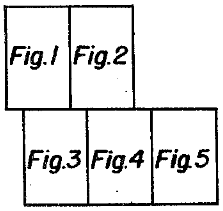
FIG. 6
INVENTOR
RUDOLPH FRANK STEHLIK
BY [signature]
ATTORNEY.

UNITED STATES PATENT OFFICE 2,613,278

TELEPHONE SYSTEM

Rudolph Frank Stehlik, Antwerp, Belgium, assignor to Automatic Electric Laboratories, Inc., Chicago, Ill., a corporation of Delaware Application April 25, 1947, Serial No. 743,965
In Great Britain January 5, 1940

Section 1, Public Law 690, August 8, 1946
Patent expires January 5, 1960

10 Claims. (Cl. 179—18)

The present invention concerns improvements in or relating to automatic or semi-automatic telephone systems and in particular is an improvement in or modification of Ostline's application Serial No. 278,727 filed June 12, 1939, now Patent No. 2,369,071, granted February 6, 1945.

In the arrangement described in the Ostline patent referred to above, the designation of a wanted subscriber's number was stored in an information-collecting arrangement or toll line control circuit for the purpose of enabling the particulars of the call to be recorded at the end of the conversation and was also stored in a connection-controlling arrangement or converter for the purpose of enabling the routing of the call to a required zone and to the wanted subscriber in that zone, and the object of the present invention is to avoid the use of the second storage means.

According to the invention an arrangement for collecting information for automatically recording sufficient particulars of a call to enable the charge to be assessed and including the called party's number is taken into use as well as apparatus for controlling the further setting up of the connection to which the called party's number is transferred from the information-collecting arrangement by successively operating a group of relays in accordance with digits of the called party's number as the operations corresponding to the preceding digits are effected in the connection-controlling apparatus.

Figure 1:
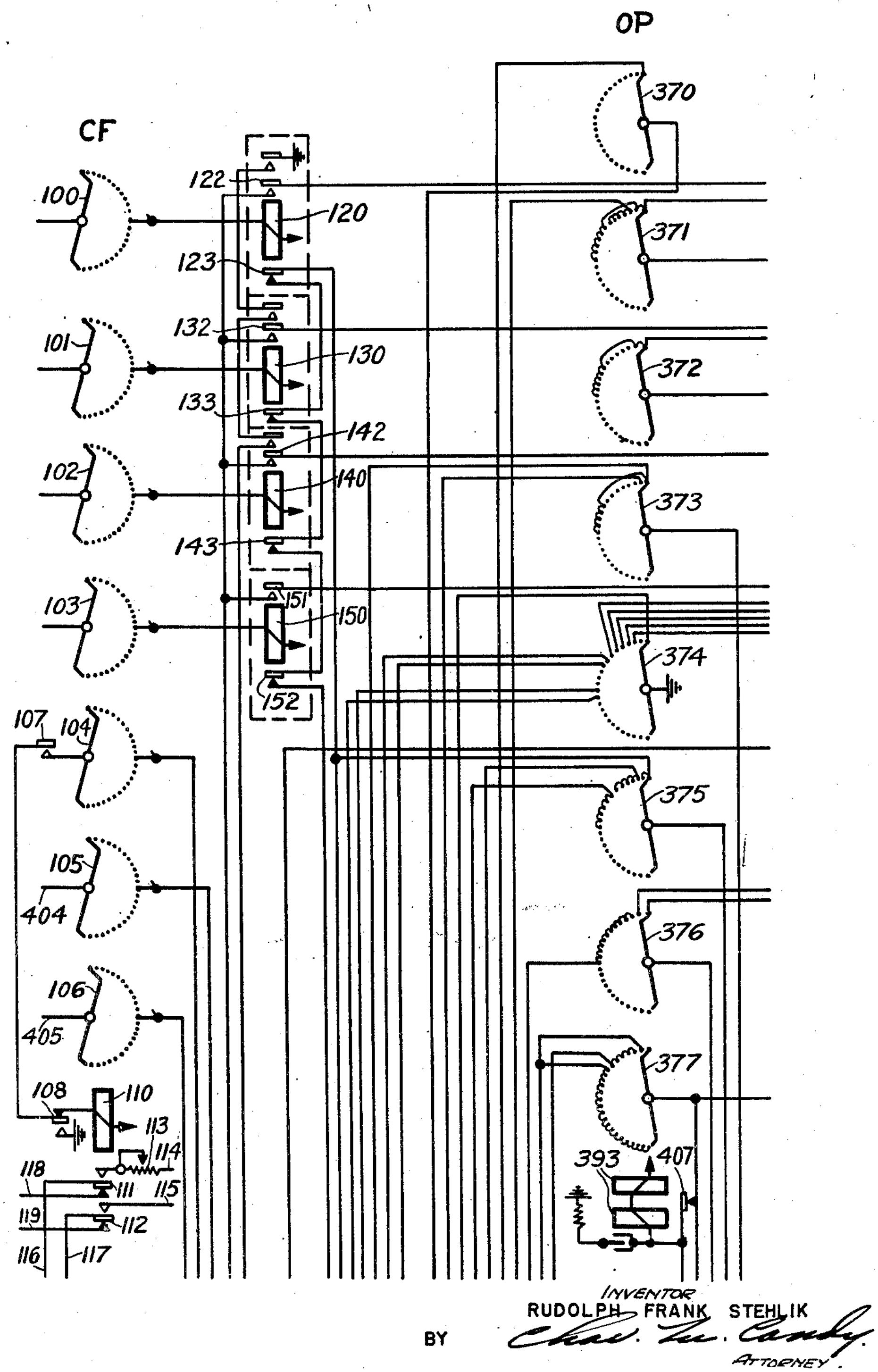
Figure 2:
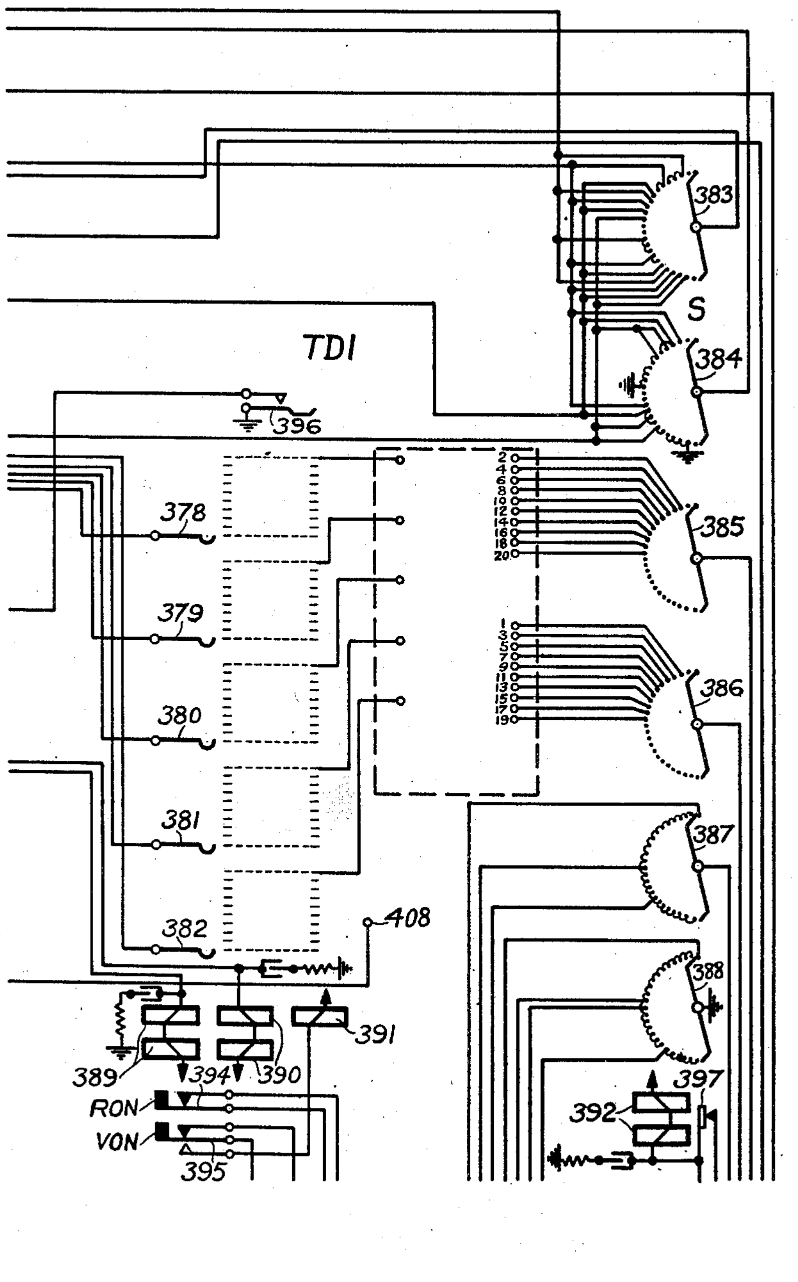
Figure 3:
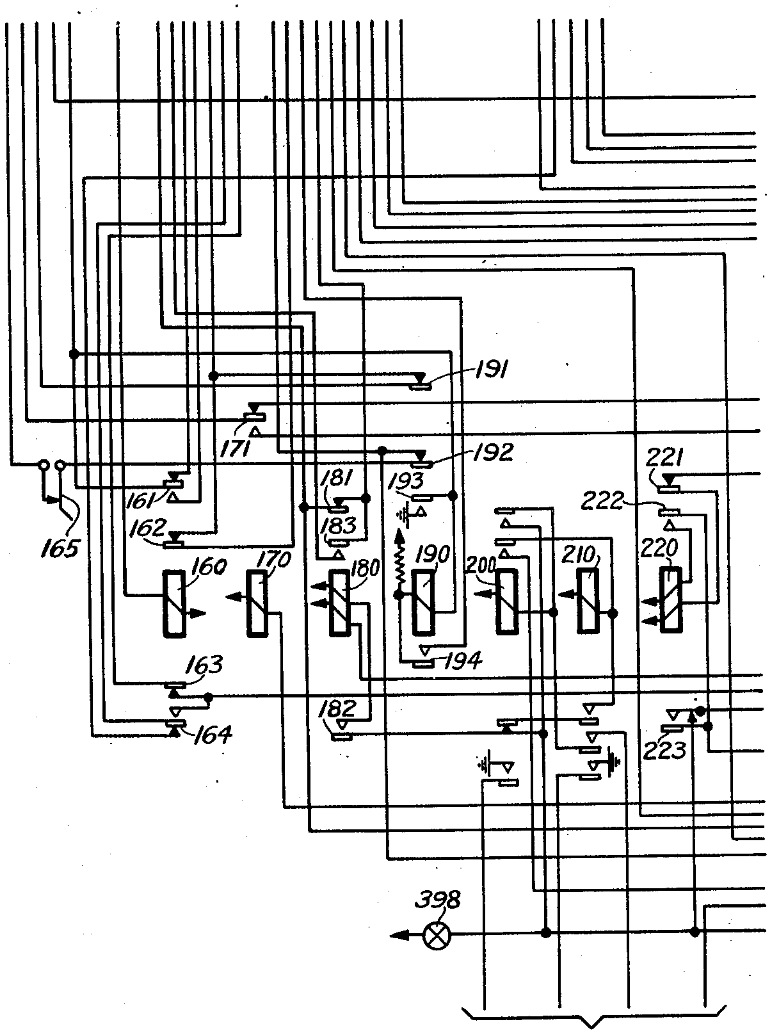
Figure 4:
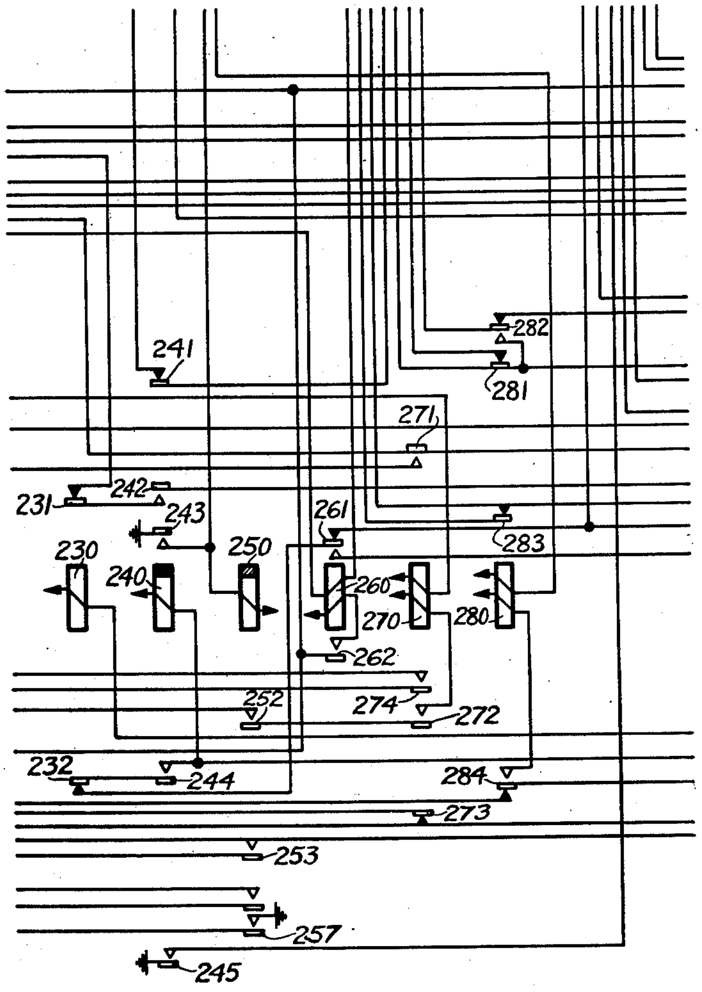
Figure 5:
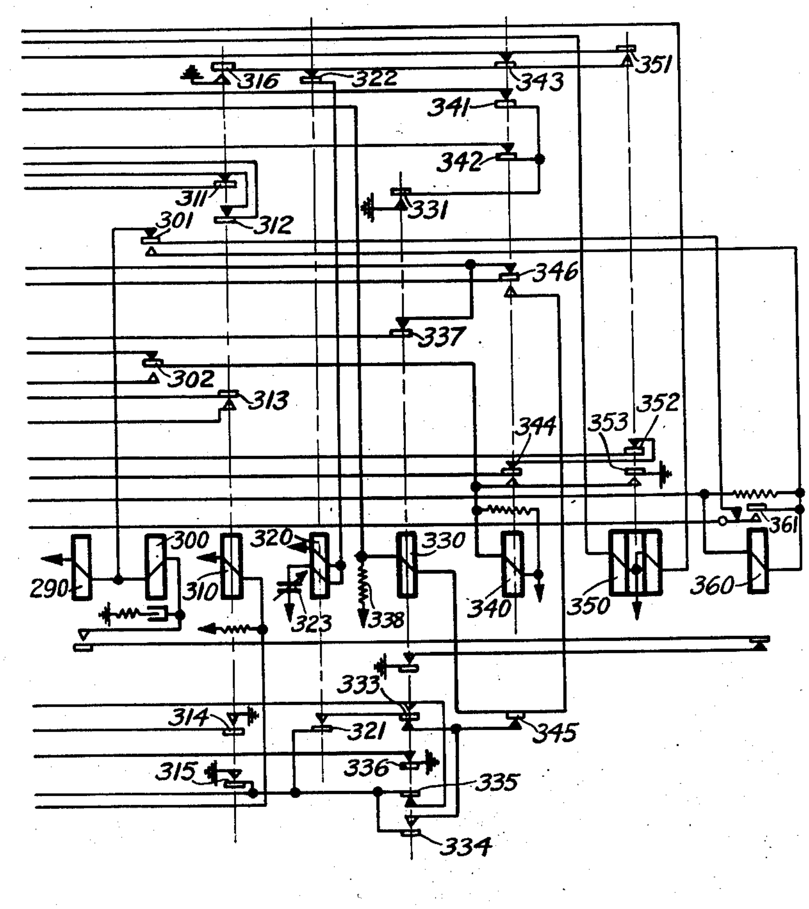

The invention will be better understood from the following description taken in conjunction with the accompanying drawings which show one embodiment thereof. In these drawings Fig. 1 shows part of the toll line control circuit which is disclosed in detail in Figs. 31–40 in the Ostline patent, and part of a modified form of the register-translator or converter shown in Figs. 41–46 of this Ostline patent while the remaining Figs. 2–5 show the remainder of the modified converter. The sheets should be arranged as shown in Fig. 6 to give the complete circuit. Fig. 7 is a table showing the digit code which is employed. Fig. 8 is a schematic diagram illustrating the location of the toll line control circuit and the converter in a telephone system of the type disclosed in the previously noted Ostline patent.

Referring to Fig. 8 it should be understood that the toll line control circuit 11 receives from a register-translator 12 located at the originating exchange certain information in code and this information is stored therein. This information comprises the calling and called parties' numbers, the rate at which the call is to be charged and other information which varies according to circumstances. In addition the called party's number as well as being stored in the toll line control circuit 11 is repeated to the converter 13 for the purpose of controlling the transmission of routing digits and also digits for effecting the selection of the proper grade of trunk line, for determining whether repeaters are to be included in the connection and for other purposes.

The switch CF shown in Fig. 1 corresponds to the switch CF of the toll line control circuit 11 of Fig. 8 and to the corresponding circuit shown in the above-mentioned Ostline patent and has access over contacts 1—16 to converters 13, etc. and over contacts 17—25 to printer controllers 14, etc. When the toll line control circuit 11 is seized the switch CF is caused to hunt for an idle converter, such as the converter 13, in the manner described in the above-mentioned Ostline patent and when an idle converter 13 is found armature 107 controlled by a relay which is not shown is closed. In addition a circuit is completed from an earth in the toll line control circuit on wiper 106 of the switch CF, key springs 165, armature 192, wiper 370 on contact 1, winding of relay 310 to battery. Relay 310 operates and at armature 314 closes an obvious circuit for relay 240 which at armature 243 closes a circuit for relay 280 over rotary off-normal springs 394 and also closes an obvious circuit for relay 250 which is slow-to-operate. Relay 250 in operating at armature 257 closes a circuit for lighting the busy lamp 398. Relay 310 at armature 315 also closes the following circuit for relay 230: earth, armatures 315, 335, winding of relay 230 to battery. In addition relay 310 at armature 316 closes a circuit extending over armature 322 for the upper winding of relay 320. Relay 320 is a self-interrupting relay owing to its armature 322 and is employed as an impulse generator, the condenser 323 provided in series with its lower winding serving to vary the rate of impulsing. Relay 320 in operating at armature 321 closes a circuit from earth at armature 315, armatures 321, 333, 345, winding of relay 330 to battery, over the resistance 338. Relay 330, however, can only operate at this time if one of the relays 120, 130, 140, or 150 have been operated since otherwise it is short-circuited from earth at armature 315, armatures 152, 143, 133, 123, contact 1 associated with wiper 375 of the switch OP to resistance 338.

The called party's number and the other information which is stored in the toll line control circuit is in coded form and each digit is represented by the operation of one or two relays of a group of four storage relays. The converter is provided with a single group of storage relays 120, 130, 140 and 150 and the digit is repeated from the toll line control circuit to the converter by extension of earth over one or more of the wipers 100, 101, 102, 103 to cause the operation of the appropriate relay in the converter. Thus if the first digit is 8 this is represented by the operation of the second of the group of storage relays and hence earth will be extended over wiper 101 of the switch CF to operate relay 130 in the converter. The code employed is shown in Figure 7 where the references in the horizontal row represent the relays 120, 130, 140, 150 while the digits are represented by the figures in the vertical column. The arrangements for storing the digits in the toll line control circuit and repeating them over the wipers of the switch CF to the converter are not shown since they are similar to those described in the previously mentioned Ostline patent.

When relay 130 has operated in accordance with the digit 8 then the above-traced short-circuit for relay 330 is opened at armature 133. If relay 320 has released before the short-circuit is removed, relay 330 will remain unoperated until the next operation of relay 320 when it operates over the circuit traced above. Relay 330 in operating locks over armature 345 and 334 to earth at armature 315 independently of relay 320.

Relay 330 at armature 331 extends earth over armature 341, wiper 373 of the switch OP on contact 1, armature 191, contact and wiper 105 of the switch CF to conductor 404. This earth is effective in energising the magnet of a switch provided in the toll line control circuit which controls the successive application of earth to the conductors extending to the storage relays so that these relays are energised successively in accordance with the digits which are to be transferred.

In addition relay 330 at armature 331 extends earth over armature 342 to the winding of the magnet 393 of the switch OP whereupon the magnet energises preparatory to stepping the wipers of the switch OP. Further, relay 330 by opening armature 335 and closing armature 333 places relay 230 under the control of relay 320, the circuit for relay 230 now extending from earth at armature 315, armatures 321, and 333, winding of relay 230 to battery. Relay 230 therefore energises and releases in synchronism with relay 320 and on the first release of relay 230 a circuit is closed from earth at armature 314, armatures 244, 232, 261 winding of magnet 392 of the switch S to battery. Magnet 392 therefore energises preparatory to stepping the wipers of the switch S. On the next energisation of relay 320, relay 230 is again energised and the above traced circuit for the magnet 392 is opened and the wipers of the switch S are stepped on to contact 2. On the next release of relay 230 and with wiper 387 of the switch S on contact 2 the following circuit is closed for the vertical magnet 389 of the two directional switch TD1: earth at armature 245, wiper 387 on contact 2, bank multipling, armatures 344, 352, 242, 231 in its resting position, wiper 376 on contact 1, winding of vertical magnet 389 to battery. This circuit is opened and closed in synchronism with the operation of relay 320 and hence relay 230 and the wipers of the two directional switch TD1 are therefore raised step by step. In addition the magnet 392 of the switch S is energised and de-energised in accordance with the operation of relay 230 over the circuit traced above and hence, for each step taken by the wipers of the switch TD1 in the vertical direction so that the wipers of the switch S also make one step. Now it was assumed that the digit stored on relays 120, 130, 140 and 150 was the digit 8 and hence the wipers of the two directional switch have to be raised to the 8th level. This control is effected over wipers 383 and 384 of the switch S. These wipers in effect act as a decoding arrangement in association with armatures 122, 132, 142, 151 of the storage relays and it will be noted that contacts 3 to 12 and 15 to 24 associated with each of the wipers are connected to earth over contacts of the storage relays in such a manner that when the number of steps taken by the wipers of the switch S and consequently by the vertical magnet of the switch TD1 correspond to the digit stored on the storage relays, earth is extended over both wipers 383 and 384. Since the digit 8 was stored on the storage relays, relay 130 only is operated and hence earth will be extended from armature 316 over armatures 343 and 132 to contact 10 associated with wiper 383; and contact 10 associated with wiper 384 is permanently earthed. Hence when wipers 383 and 384 reach contacts 10 earth will be extended over wiper 383, contact 1 associated with wiper 372, left hand winding of relay 350 to battery. In addition earth will be extended over wiper 384, contact 1 associated with wiper 371, right hand winding of relay 350 to battery. Relay 350 is so arranged that it operates only when both its windings are energised and owing to the connections made to the contacts associated with wipers 383 and 384 the energisation of both windings only takes place when the magnet 392 of the switch S and the vertical magnet of the two directional switch have operated a number of times equivalent to the digit registered on the storage relays. Relay 350 in operating at armature 353 closes a circuit for relay 340 and at armature 352 relay 350 opens the above traced circuit for the vertical magnet 389 of the switch TD1.

In addition at armature 351 relay 350 short-circuits armature 343 so that earth is still applied to the contacts of the storage relays 120, 130, 140 and 150. Relay 340 in operating at armature 341 removes earth from conductor 404 which earth was extended thereto on the operation of relay 330 previously described. It should be pointed out that where, as in the arrangement described in Ostline Patent No. 2,369,071, the digits representing the called party's number are stored in the toll line control circuit and the converter on groups of storage relays, the repeating of the coded indications of these digits from the toll line control circuit to the converter may take place continuously by the synchronous stepping of a switch in the toll line control circuit and a switch in the converter, each switch having at least four wipers and one relay of each group being connected to corresponding contacts associated with the wipers. In this case the control of the two switches is conveniently effected from the toll line control circuit. In the present arrangement, however, since only one storage group comprising the relays 120, 130, 140 and 150 is provided, these relays must remain operated until the converter has completed its operation consequent upon the repetition of a digit. Hence, the switch in the toll line control circuit which controls the operation of relays 120, 130, 140 and 150 must be stepped from the converter. This is effected by earthing conductor 404 when relay 330 operates to energize the switch magnet, which earth is removed to enable the wipers to be stepped when relay 330 operates on the completion of the operation of the converter in response to the particular digit stored on relays 120, 130, 140 and 150. When the switch is stepped onto the next contact, these relays are operated in accordance with the next digit. At armature 342 relay 340 opens the circuit previously traced for magnet 393 of the switch OP whereupon the magnet de-energises and the wipers are stepped on to contact 2. When wiper 370 of the switch OP steps off contact 1, the original circuit for relay 310 is opened but the relay is now held operated over armature 253 of relay 250 and armature 192. At armature 345 relay 340 opens the locking circuit for relay 330 which releases. Relay 330 in releasing removes relay 230 from under the control of relay 320 so that relay 230 remains permanently energised. Further relay 330 at armature 337 closes the following self-interrupting circuit for the magnet 392 of the switch S: earth, wiper 388 of the switch S on contact 10, armature 337, self-interrupting contacts 397, winding of magnet 392 to battery. The wipers of the switch S are thus rotated to contact 13 where the self-interrupting circuit is opened. When wipers 383 and 384 of the switch S are moved off contact 10 both windings of relay 350 will be de-energised and hence relay 350 releases and opens the energising circuit of relay 340. Relay 340 however remains held over armature 344, bank multipling and wiper 387 to earth at armature 245 until wiper 387 reaches contact 13 when the circuit is opened and relay 340 releases. Relay 330 can now operate again provided it is not short-circuited by contacts of the storage relays and relays 320 and 350 are now in a position to control the operation of the rotary magnet 390 of the two directional switch TD1. This operation takes place in a similar manner to that described above for the vertical magnet and the number of steps taken by the rotary magnet is controlled by wipers 383 and 384 rotating over contacts 15 to 25. It is to be noted that with wiper 373 on contact 2, the circuit over conductor 404 now extends as follows: earth at armature 331, armature 341, wiper 373 on contact 2, armature 162, 191 to conductor 404.

It is to be noted that the energising circuit for relay 280 is opened on the first rotary step of the switch TD1 at rotary off-normal springs 394. This relay is however maintained operated over its lower winding and armature 284 to earth at armature 336 until the termination of the rotary movement of the switch TD1 when relay 330 releases to open this circuit and allow relay 280 to release.

At the end of the rotary movement of the switch TD1, the wipers of the switch OP are stepped to position 3, while the wipers of the switch S are returned to position 1. The following circuit is now closed for the upper winding of relay 260: earth, at armature 245, wiper 387 of the switch S on contact 1, upper winding of relay 260, contact 3 and wiper 371 of the switch OP, right hand winding of relay 350 to battery. Relay 350 does not operate at this time. Relay 260 in operating locks over armatures 262 and 343 to earth at armature 316 and at armature 261 it changes over the impulsing circuit which includes armature 232 of relay 230 from the magnet 392 of the switch S to relay 290, the circuit now including the make-before-break springs of armature 361 and armature 301.

When the distant exchange is ready to receive the first impulse train, an alternating current signal is transmitted back to the toll line control circuit to cause the momentary operation therein of a relay (not shown) which at armature 108 extends earth over armature 107, wiper 104 of the switch CF, armature 171 in its rest position, upper winding of relay 270 to battery. Relay 270 at armature 272 closes a locking circuit for itself over armature 252, make-before-break springs of armature 253 to earth armature 257 and at armature 273 opens the following short circuit around relay 330: earth, armatures 315, 273, contact 3 and wiper 375, resistance 338 to battery.

Relay 330 will operate on the next operation of relay 320 after the above short-circuit has been removed and in addition to performing the operations described above relay 330 at armature 336 closes a circuit extending over armature 284 in its rest position for relay 170. With relay 170 operated and with wiper 376 of the switch OP on contact 3, the impulsing circuit which includes armature 231 of relay 230 is extended over wiper 376, armature 313 and armature 171 of relay 170 over wiper 104 of the switch CF, armature 107 and relay 110 in the toll line control circuit. This impulsing circuit is employed for the transmission of impulses over the junction or toll line under the control of the converter. It is to be noted that direct-current impulses are repeated from the converter to the toll line control circuit while at the toll line control circuit the direct current impulses are converted into alternating current impulses, armatures 111 and 112 of relay 110 serving to disconnect the incoming conductors 118 and 119 from the toll line conductors 116 and 117 and to connect the latter over a variable resistance 113 to terminals 114 and 115 to which a source of alternating current having a frequency of, for instance, 50 cycles is connected.

With regard to the impulses which are transmitted from the converter, first a number of non-decimal trains of impulses are transmitted which are necessary for interworking with net-works operating on a different principle and also for controlling the selection of the appropriate grade of toll or trunk lines and the insertion of repeaters and similar functions. Second the exchange designation and the numerical digits of the called party are transmitted without translation.

For the purpose of transmitting the non-decimal trains of impulses the arrangement employed is similar to that described in the previously mentioned Ostline patent. Since this arrangement forms no part of the present invention and since it is described in detail in the above mentioned Ostline patent it will only be described briefly. The contacts in the banks associated with wipers 378 to 382 of the switch TD1 are arbitrarily cross-connected to the terminals marked 1 to 20 and associated with the contacts of wipers 385 and 386. Thus if the contact on which wiper 378 is set corresponds to a train of 12 impulses that contact will be cross-connected to terminal 12. For two releases of relay 230, armature 231 serves to transmit two impulses over wiper 104 while armature 232 causes the wipers of the switch S to make one step only, the second operation of armature 232 causing a test circuit to be transferred from wiper 386 to wiper 385. Thus for each step of the switch S a test is made for two digits. The control of this test circuit is effected by relays 290, 300 and 360 in a similar way to that described in the above mentioned Ostline patent. When the 12 impulses have been transmitted relay 340 is operated from earth at wiper 374 on contact 3, wiper 378 and cross-connection to terminal 12, contact 8 and wiper 385, armature 302 in its rest position, winding of relay 340 to battery. Relay 340 operates to stop the impulse transmission and to prepare for the transmission of the next train as previously described. If the digit to be transmitted had been odd, then the circuit for relay 340 would have extended over wiper 386, and armature 302 in its working position.

It is to be noted that when the first impulse is transmitted to relay 110, a parallel circuit extends over armatures 271 and 221, lower winding of relay 220 to battery. Relay 220 operates and locks over its upper winding and armature 222 in parallel with the lower winding of relay 260. In addition at armature 223 relay 220 opens the first locking circuit for relay 270 and closes a second which is also in parallel with those of relays 220 and 260. Relays 220, 260 and 270 are thus dependent on relay 340 and will therefore remain energised for the duration of the train when they will be released on the operation of relay 340. These relays are operated as described above prior to the first and sixth trains of impulses only. For subsequent impulse trains the interdigital pause is effected by the timed stepping of the switch S on its return movement. This homing circuit extends over a self-interrupting circuit which includes armature 337 up to contact 19 associated with wiper 388 with the exception that on contact 13 the circuit extends in addition over armature 281. When the wiper 388 reaches contact 20, earth is extended over armature 282, 346, to the winding of relay 330. Relay 330 operates and the switch now steps to contact 1 under the control of relay 230.

The converters which are relatively few in number are placed in one group and may therefore be employed on a call which is to be set up over a high or low grade junction i. e. a junction having good or poor transmission characteristics. Now the first non-decimal digit transmitted from the converter controls the insertion of speech repeaters and other apparatus for modifying the speech level and since the apparatus to be inserted will depend upon the grade of junction, provision may be made for varying the first digit according to the grade of junction. Such an arrangement which is not shown comprises an additional relay, an armature of which is connected to contact 3 associated with wiper 374 of the switch OP. The back contact of this armature is connected to wiper 378 of the switch TD1 while the front contact is connected to a sixth wiper of this switch. On a call which is to be set up over a poor grade junction, the relay is not operated and the first digit which is transmitted is determined by the cross-connection extending from the appropriate contact associated with wiper 378. On a call which is to be set up over a high grade junction the relay is operated and the first digit is determined by the cross-connection extending from the appropriate contact associated with the sixth wiper of the switch TD1.

Provision is made for the transmission of five non-decimal impulse trains the switch OP taking a step at the end of each train so that at the end of the transmission of the fifth train, the wipers of the switch OP will be in position 8. It is to be noted that contacts 3 to 8 associated with wiper 373 of the switch OP are disconnected. This wiper in association with contacts 1 and 2 as previously pointed out controls the operation of the switch in the toll line control circuit over which the storage relays 120, 130, 140 and 150 are operated. When the wiper 373 is stepped from contact 2, the switch in the toll line control circuit is stepped on to contact 3 to cause the operation of the storage relays in accordance with the third digit of the called party's number. This digit is retained on the storage relays until it is wanted at the end of the transmission of the non-decimal impulse trains and hence contacts 3 to 8 associated with wiper 373 are disconnected.

With wiper 375 on contacts 8 to 13 relay 330 is short-circuited from earth at armature 315, armature 181, contact 8 and wiper 375, resistance 338 to battery. With wiper 374 on contact 8, earth is extended over this wiper, armature 164, self-interrupting contacts 407, winding of magnet 393 to battery. The wipers of the switch OP are thus stepped to position 9. When as described above a signal is received from the distant exchange indicating that the equipment thereat is ready to receive the sixth impulse train, relay 270 is again operated and at armature 274 closes the following circuit: earth, wiper 374 on contact 9, armatures 163, 274, lower winding of relay 180 to battery. Relay 180 operates and locks over its upper winding and armature 182 to earth at armature 257 and at armature 181 it opens the previously traced short circuit for relay 330 and at armature 183 it closes another short-circuit for relay 330 which is dependent on the condition of the storage relays. If one or two of the storage relays have been operated the short-circuit will be opened and relay 330 will operate to initiate the transmission of the sixth impulse train. Relay 180 is maintained operated for the remainder of the impulse transmission.

The remaining five impulse trains are transmitted under the control of wipers 383 and 384 and relay 350 in a manner similar to the impulsing of the vertical and rotary magnets of the switch TD1 with the exception that contacts 1—12 associated with wipers 383 and 384 only are employed due to the unoperated condition of relay 280 thereby allowing a suitable interdigital pause to be given by the time stepping of the switch S as previously described.

When the five impulse trains have been transmitted, the wipers of the switch OP will be at position 14 when earth is extended over wiper 374 and armature 161 to operate relay 190. Relay 190 locks over armature 193, at armature 191 opens the circuit to the switch magnet in the toll line control circuit and at armature 192 opens the circuit for relay 310. Relay 310 releases and at its various armatures causes the release of all the operated relays with the exception of relay 190.

Following the release of relay 240 the following circuit is closed for restoring the two-directional switch TD1 to normal: earth, wiper 388 on contact 1, armature 241, vertical off-normal springs 395 in their operated position winding of release magnet 391 to battery. The wipers of the switch TD1 are thus restored to normal and the vertical off-normal springs 395 return to their rest position when the above traced circuit is extended over armature 311, bank multipling and wiper 377, self-interrupting contacts 407, winding of magnet 393 to battery. The wipers of the switch OP are thus returned to position 1 when earth is extended over wiper 374 and armature 194 to short circuit relay 190 which thereupon releases. The converter can now be employed on another call.

In the above description it has been assumed that five non-decimal impulse trains were transmitted. This is the maximum number but arrangements are provided whereby a less number of trains may be transmitted. Assume for instance that for a particular setting of the switch TD1, four trains are due to be transmitted instead of five. A connection is in this case made from the particular contact associated with wiper 382 to terminal 408. Hence when wiper 374 of the switch OP is stepped on to contact 7, earth is extended over this wiper and wiper 382 to terminal 408 and thence over the self-interrupting contact 407, winding of magnet 393 to battery. The wipers of the switch OP will thus be stepped on to contact 8 before the return to normal of the switch S on the termination of the previous train. As a result four trains of impulses only are transmitted. It will be appreciated that if the first digit received by the converter is sufficient to determine that say four trains only are necessary, the whole level of contacts corresponding to the first digit received will be connected together and to terminal 408. It will also be appreciated that three or even two trains may be sufficient in which case suitable connections are made between contacts associated with wipers 381 and 380 and terminal 408.

Relays 200 and 210 are provided for alarm purposes if the converter is not released within a specified time. The operation of these relays which is well known is of no importance with regard to the present invention and hence will not be described further.

The circuit arrangements illustrated in the register translator or converter, but not described in detail therein, for accommodating one or two digit zone codes and for accommodating three digit special service calls, are disclosed and claimed in the co-pending application of Rudolph F. Stehlik, Serial No. 743,964, filed April 25, 1947.

I claim:

1. In a telephone system, a calling line, a called line, switching apparatus for automatically setting up a connection from said calling line to said called line, information collecting means included in said connection comprising a plurality of storage devices for storing said called line number, means for operating said storage devices to store the digits of said called line number, an automatic switch included in said collecting means, a sender, a relay group in said sender operative to register only one digit at any one time, means for associating said sender with said collecting means, means controlled responsive to said association for successively operating one or more of the relays in said relay group in accordance with the successive digits of said called subscriber number stored in said storage devices, means in said sender controlled responsive to each operation of said relay group in accordance with each of the digits stored in said storage devices for generating a series of impulses corresponding to the numerical value of each of said stored digits and for controlling said automatic switch to select said digit storage device storing the next digit of said called subscriber number, a routing switch in said sender operated responsive to a predetermined number of series of said generated impulses for transmitting a predetermined number of routing digits to said switching apparatus, and means operated responsive to the remaining number of series of said generated impulses for transmitting a corresponding number of directing digits to said switching apparatus, whereby said routing and said directing digits complete the setting up of said connection from said calling line to said called line.

2. In a telephone system, a toll line control circuit, a calling line, a called line, means for establishing a connection from said calling line to said toll line control circuit, storage devices in said toll line control circuit operated over said connection to register the digits of said called line number, a sender, means for associating said toll line control circuit with said sender, a single-digit register in said sender, means for successively operating said single-digit register in accordance with the successive digits of said called number registered in said storage devices, means in said sender for translating the first two digits received by said single-digit register into a plurality of routing digits, means in said sender operated in accordance with the remaining single-digit received by said digit register for transmitting a corresponding number of switch controlling digits, and means controlled by said routing digits and said switch controlling digits for establishing a connection from said toll line control circuit to said called line.

3. In a telephone system including a calling line and a called line and a toll line and switching apparatus for automatically setting up connections from a calling line to said toll line, a toll line control circuit included in said connection comprising a plurality of storage devices for storing a called line number, a sender, a group of relays in said sender, means controlled responsive to the setting up of a connection from said calling line to said toll line control circuit for associating said sender with said control circuit and for storing in said storage devices the digits of said called line number, means for transferring each of the digits of said called line number from said storage devices to said group of relays in a predetermined order, means in said sender for preventing said transfer means from transferring the next succeeding digit of said called line number until said sender has completed its operations responsive to the transfer of the preceding one of said digits, means in said sender controlled responsive to the receipt of certain number of said digits in said called line number for translating said certain number of digits into a predetermined number of routing digits, means in said sender for transmitting series of impulses corresponding respectively to each of said routing digits and to each of the remaining digits of said called line number to said toll line control circuit, and means in said toll line control circuit for repeating said series of impulses over said toll line thereby to complete said connection over said toll line to said called line.

4. In a telephone system, a register sender including a single-digit register and route mechanism and a digit sender, means for transmitting a series of digits to said register sender, means for successively operating said single-digit register to register successive ones of said digits, means governed in accordance with the successive operations of said single-digit register to register an initial number of said digits for selectively operating said route mechanism to establish one or more routing digits, means for operating said digit sender to send said established routing digit or digits, and means governed in accordance with the successive operations of said single-digit register to register a subsequent number of said digits for operating said digit sender to send a subsequent number of corresponding additional digits.

5. In a telephone system, a register sender including a single-digit register and a two-motion route switch and a digit sender, means for transmitting a series of digits to said register sender, means for successively operating said single-digit register to register successive ones of said digits, means governed by the first two successive operations of said single-digit register to register the first two of said digits for selectively setting said route switch in its two motions in order to establish one or more routing digits, means for operating said digit sender to send said established routing digit or digits, and means governed by the third, etc. successive operations of said single-digit register to register the third, etc. of said digits for operating said digit sender to send corresponding additional digits.

6. In a telephone system, a register sender including a digit register and route mechanism and a digit sender, means for transmitting a series of digits to said register sender, means for operating said digit register to register a first of said digits, means responsive to said operation of said digit register for imparting a primary setting to said route mechanism, means responsive to said primary setting of said route mechanism for releasing said digit register, means for reoperating said digit register to register a second of said digits, means responsive to said reoperation of said digit register for imparting a secondary setting to said route mechanism, means responsive to said secondary setting of said route mechanism for releasing said digit register, and means governed by said primary and secondary settings of said route mechanism for operating said digit sender to send a predetermined routing digit or digits.

7. In a telephone system, a register sender including a digit register and route mechanism and a digit sender, means for transmitting a series of digits to said register sender, means for operating said digit register to register a first of said digits, means responsive to said operation of said digit register for imparting a primary setting to said route mechanism, means responsive to said primary setting of said route mechanism for releasing said digit register, means for reoperating said digit register to register a second of said digits, means responsive to said reoperation of said digit register for imparting a secondary setting to said route mechanism, means responsive to said secondary setting of said route mechanism for releasing said digit register, means governed by said primary and secondary settings of said route mechanism for operating said digit sender to send a predetermined routing digit or digits, means for reoperating said digit register to register a third of said digits, means governed by said last-mentioned reoperation of said digit register for reoperating said digit sender to send a corresponding additional digit, and means responsive to said reoperation of said digit sender for releasing said digit register.

8. In a telephone system, a register sender including a single-code-digit register and route mechanism and a digit sender, said code-digit register including a group of relays selectively operative in different combinations in accordance with different digit values, means for transmitting a series of digits in code to said register sender, means for successively operating said code-digit register to register successive ones of said digits, means governed in accordance with the successive operations of said code-digit register to register an initial number of said digits for selectively operating said route mechanism to establish one or more routing digits, means for operating said digit sender to send said established routing digit or digits, and means governed in accordance wtih the successive operations of said code-digit register to register a subseouent number of said digits for operating said digit sender to send a subsequent number of corresponding additional digits.

9. In a register sender, a single-digit register successively operated responsive to the receipt of each digit of a number, means for generating a series of impulses responsive to each operation of said single-digit register, means controlled responsive to the generation of an initial number of said series of impulses for establishing a group of routing digits, means for sending said group of routing digits, and means controlled responsive to the generation of a subsequent number of said series of impulses for sending a group of directing digits.

10. In a register sender, a single-digit register successively operated to register the successive digits of a number, sender mechanism, means for operating said sender mechanism to generate an initial number of series of impulses corresponding to an initial number of operations of said single-digit register, route mechanism, means for setting said route mechanism in accordance with said initial number of said series of impulses in order to establish a group of routing digits, a toll line, means for operating said sender mechanism to send over said toll line a first group of series of impulses corresponding to said group of routing digits, means for operating said sender mechanism to generate a subsequent number of series of impulses corresponding to a subsequent number of operations of said single-digit register and constituting a group of directing digits, and means for operating said sender mechanism to send over said toll line a second group of series of impulses corresponding to said group of directing digits.

RUDOLPH FRANK STEHLIK.

REFERENCES CITED

The following references are of record in the file of this patent:

UNITED STATES PATENTS

| Number | Name | Date |
|---|---|---|
| 1,724,174 | Bellamy et al. | Aug. 13, 1929 |
| 1,903,019 | Wright | Mar. 28, 1933 |
| 1,962,619 | Rumpf | June 12, 1934 |
| 2,180,824 | Hatton | Nov. 21, 1939 |
| 2,289,939 | Stehlik | July 14, 1942 |
| 2,339,709 | Ostline | Jan. 18, 1944 |
| 2,369,071 | Ostline | Feb. 6, 1945 |
| 2,385,228 | Ostline | Sept. 18, 1945 |

FOREIGN PATENTS

| Number | Country | Date |
|---|---|---|
| 532,730 | Great Britain | Jan. 30, 1941 |